United States Patent [19]
Dorner

[11] Patent Number: 5,131,529
[45] Date of Patent: Jul. 21, 1992

[54] DRIVE MECHANISM FOR A CONVEYOR

[75] Inventor: Wolfgang C. Dorner, Oconomowoc, Wis.

[73] Assignee: Dorner Mfg. Corp., Hartland, Wis.

[21] Appl. No.: 774,480

[22] Filed: Oct. 10, 1991

[51] Int. Cl.[5] .................................... B65G 23/04
[52] U.S. Cl. .................................. 198/835; 198/789
[58] Field of Search ............... 198/788–791, 198/834, 835

[56] References Cited

U.S. PATENT DOCUMENTS

| | | | |
|---|---|---|---|
| 3,685,367 | 8/1972 | Dawson | 198/834 |
| 3,805,631 | 4/1974 | Kerklies | 198/834 |
| 3,923,148 | 12/1975 | Dorner | 198/835 |
| 4,314,629 | 2/1982 | Shilander et al. | 198/789 |

FOREIGN PATENT DOCUMENTS

| | | | |
|---|---|---|---|
| 386809 | 9/1990 | European Pat. Off. | 198/788 |
| 1580051 | 8/1969 | France | 198/789 |

*Primary Examiner*—Joseph E. Valenza
*Attorney, Agent, or Firm*—Andrus, Sceales, Starke & Sawall

[57] ABSTRACT

A drive mechanism for a conveyor. The conveyor includes a frame and a drive spindle that carries a conveyor belt is journalled for rotation on the frame. The spindle has a longitudinal passage and a pair of bushings are disposed in spaced relation in the passage, with the adjacent ends of the bushings spaced apart. Each bushing has a non-circular or hexagonal-shaped opening and a similarly contoured end of a drive shaft is inserted into the opening of one of said bushings. The inner end of the drive shaft is provided with an axial recess and a plunger is located within the recess and is biased outwardly by a spring. A locking member is mounted in a radial hole in the wall of the inner end of the drive shaft and is engaged with a cam surface on the plunger. To assemble or remove the drive shaft from the bushing an elongated tool is inserted in the opposite end of the spindle to move the plunger inwardly against the spring biasing force, thereby releasing the locking member and enabling the drive shaft to be moved relative to the spindle.

23 Claims, 2 Drawing Sheets

DRIVE MECHANISM FOR A CONVEYOR

BACKGROUND OF THE INVENTION

A typical conveyor used for conveying relatively small articles includes a generally U-shaped frame and a drive spindle is journaled relative to the frame and carries a conveyor belt. As disclosed in U.S. Pat. No. 3,923,148, the bearings for journaling the spindle relative to the frame can be located within the spindle with the result that no bearings project laterally beyond the side walls of the frame, thus enabling two conveyors to be placed in close side-by-side relation.

To drive the spindle, the spindle is formed with an integral internal bushing having a hexagonal or other non-circular shaped opening that receives the hexagonal end of a drive shaft, thus enabling rotation of the drive shaft to be transmitted to the spindle. To prevent axial displacement of the drive shaft from the spindle, it has been the practice to thread a bolt into the inner end of the drive shaft and the head of the bolt bears against the end of the bushing to prevent axial displacement of the drive shaft from the spindle. With this construction, the bolt is threaded into the end of the drive shaft using an elongated tool, which is inserted from the opposite end of the spindle and engages the bolt head. As conveyors of this type may have a substantial width, up to twenty-four or thirty inches, it is a difficult and tedious task to engage and disengage the bolt from the inner end of the drive shaft.

In the typical conveyor, as used in the past, the hexagonal opening in the spindle bushing was formed by a broaching operation. With elongated spindles as used with wide conveyors, it has proven difficult to broach a hexagonal bushing opening in both ends of the spindle, with the result that the spindle has normally been provided with only one hexagonal bushing opening adjacent one end of the spindle. Therefore the drive shaft could be mounted only on one side of the conveyor frame and could not be reversed to the opposite side.

SUMMARY OF THE INVENTION

The invention is directed to an improved drive mechanism for a conveyor and in particular to an improved mechanism for connecting the end of a drive shaft to a drive spindle of the conveyor.

The conveyor includes a frame and a drive spindle is journaled relative to the side walls of the frame and carries a conveyor belt. To journal the spindle relative to the frame, a hub is mounted in an opening in each side wall of the frame and projects inwardly of the side wall, and the ends of the spindle are journaled by internal bearing assemblies on the inwardly projecting ends of the hubs.

The drive spindle is provided with a central longitudinal passage and a pair of bushings are secured in spaced relation in the passage, with the adjacent ends of the bushings being spaced apart. Each bushing has a non-circular, preferably hexagonal, central opening.

The end of a drive shaft having a similar contour is inserted into the opening in one of the bushings. The inner end of the drive shaft is provided with an axial recess within which a plunger is mounted for sliding movement and the plunger is biased outwardly of the recess by a spring. A locking member, which can take the form of a ball or sphere, is mounted for movement in a radial hole in the wall of the inner end of the drive shaft and is engaged with the projecting outer end of the plunger. When the end of the drive shaft is inserted within the bushing, the ball, which projects outwardly of the radial hole in the drive shaft, engages the outer end of the bushing, preventing the drive shaft from being inserted into the bushing until an elongated tool is inserted into the opposite end of the spindle to depress the plunger against the force of the biasing spring. Depressing the plunger, while applying an inward force to the drive shaft, will wedge the ball inwardly. With the ball moved inwardly, the drive shaft can then be inserted into the bushing and the tool can be disengaged from the plunger. When the drive shaft is fully inserted in the bushing, the spring-loaded plunger will force the ball radially outward, so that the ball engages the inner end of the bushing to prevent the drive shaft from being removed from the bushing.

To release the locking member, the elongated tool is inserted in the opposite end of the drive spindle and acts to depress the plunger against the biasing spring. Simultaneously, an outward pull is applied to the drive shaft causing the ball to be wedged inwardly to a position where the outer periphery of the ball is within the outer surface of the drive shaft. With the ball moved out of locking engagement, the drive shaft can then be removed from the bushing.

The elongated tool used to depress the plunger can be a rod of any desired cross section, small enough to be inserted into the spindle to engage the end of the plunger.

The invention provides a simple, yet effective, mechanism for attaching a drive shaft to a drive spindle of a conveyor. With the use of the invention, the time required for installation of the drive shaft to the spindle is substantially reduced over prior mechanisms which required the use of auxiliary bolts or other connectors. Furthermore there are no threaded connections which could loosen when subjected to vibration during service.

The drive shaft cannot be fully inserted and locked within the bushing except through insertion of the tool from the opposite end of the spindle. This prevents drive shafts from being inserted into both ends of the spindle, for if it was possible to insert drive shafts into both ends, they could not be removed.

As a bushing is located at both ends of the drive spindle, the drive shaft can be assembled on either side of the conveyor. It is also possible to slave a number of conveyors together, in which a single drive shaft is inserted through a series of aligned drive spindles of a group of conveyors that are in side-by-side relation.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
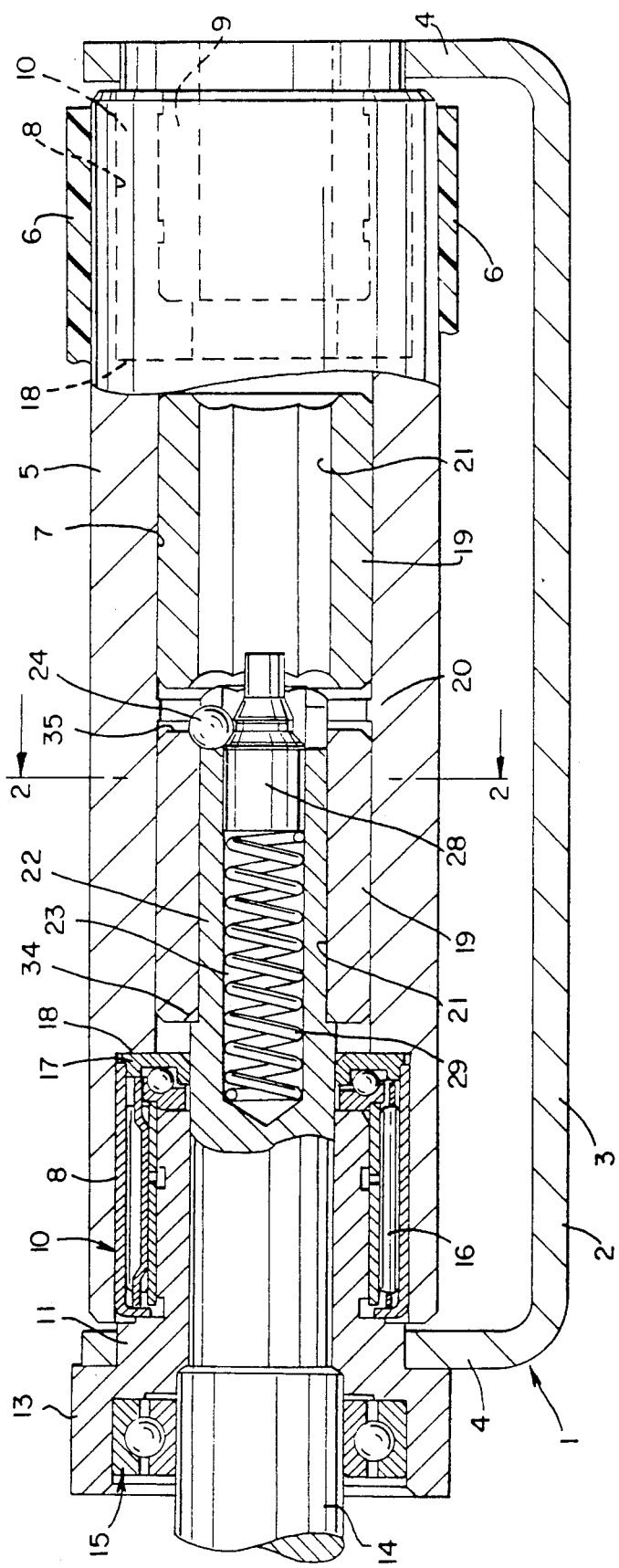
FIG. 1 is a transverse section of a conveyor incorporating the present invention.

FIG. 1 illustrates a conveyor 1 including a generally U-shaped frame 2. Frame 2 comprises a flat base 3 and a pair of spaced parallel side walls 4 which extend upwardly from base 3.

A drive spindle 5 is journaled between side walls 4 and carries a conveyor belt 6. Articles are adapted to be conveyed on the upper run of belt 6. Drive spindle 5 is provided with a central longitudinal passage 7 and the ends of passage 7 are enlarged in diameter, as indicated by 8.

To journal spindle 5 relative to frame 2, a hub 9 is mounted in an opening in one of the side walls 4 and the hub 9 projects inwardly of the side wall and the corresponding end of spindle 5 is journaled for rotation on the projecting inner end of hub 9 by a bearing assembly 10. Similarly, a hub 11 is mounted in an opening in the other side wall 4 and the corresponding end of drive spindle 5 is journaled on the inner portion of hub 11 by a bearing assembly 10. Hub 11 is provided with an enlarged boss 13 which is located outwardly of the side wall 4, and a drive shaft 14, which is connected to a suitable driving source, such as a motor, is journaled within the boss 13 by a roller bearing assembly 15.

Bearing assemblies 10 each include a needle bearing unit 16 which serves to support the respective ends of the spindle for rotation on hubs 9 and 11, and a thrust bearing unit 17 which is located between the inner end of each hub and shoulder 18 which separates the passage 7 from the enlarged end 8 of the spindle.

Hubs 9 and 11 can be connected to the side walls 4 in any convenient manner to prevent rotation of the hubs relative to the side walls. This can be accomplished by use of a keeper plate, not shown, which is connected between the outer end of the hub and the side wall.

Located within passage 7 is a pair of bushings 19 that are formed separately from spindle 5. Bushings 19 are press fitted in spaced relation within passage 7, with the adjacent ends of the bushings being spaced apart by an internal rib 20. Each bushing is formed with an axial hole 21 of non-circular cross section, preferably a hexagonal cross-section. The hexagonal holes 21 of bushings 19 are in registry so that a single drive shaft can be inserted through the holes when slaving a number of conveyors together.

Figure 2:
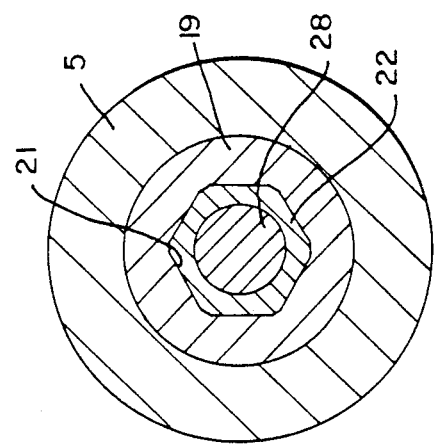
FIG. 2 is a section taken along FIG. 2—2 of FIG. 1.

As shown in FIG. 2, the inner end 22 of drive shaft 14 has a generally hexagonal configuration and is received within the opening 21 of one of the bushings 19. The complementary hexagonal configuration of shaft end 22 and opening 21 will transmit rotation of the drive shaft to drive spindle 5 to drive belt 6.

Figure 3:
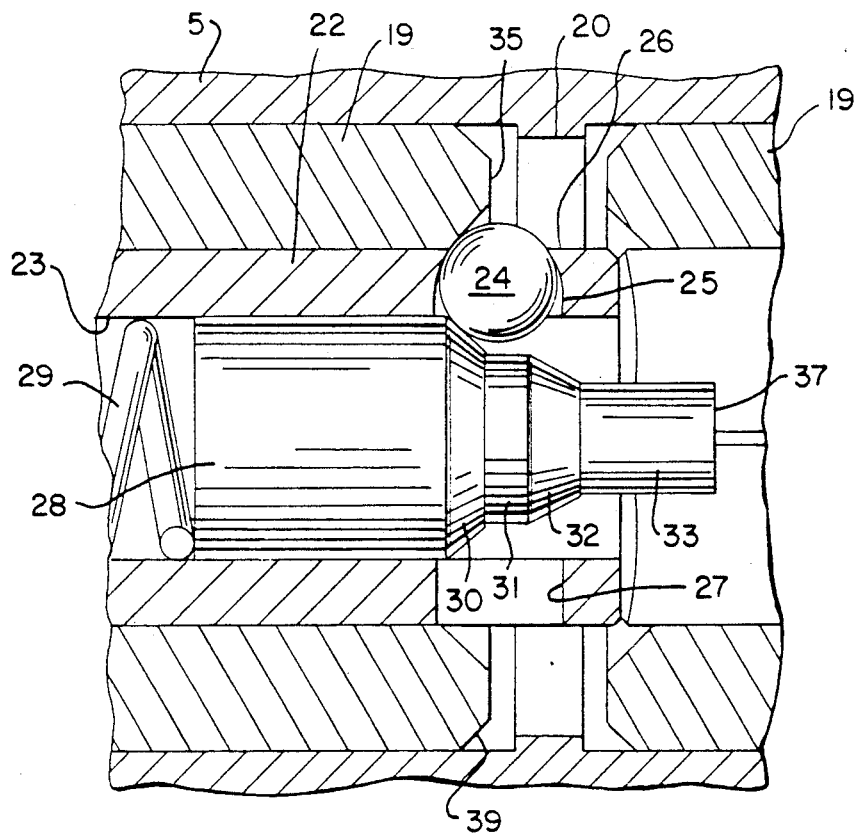
FIG. 3 is an enlarged fragmentary longitudinal section showing the locking ball in the locking position.
Figure 4:
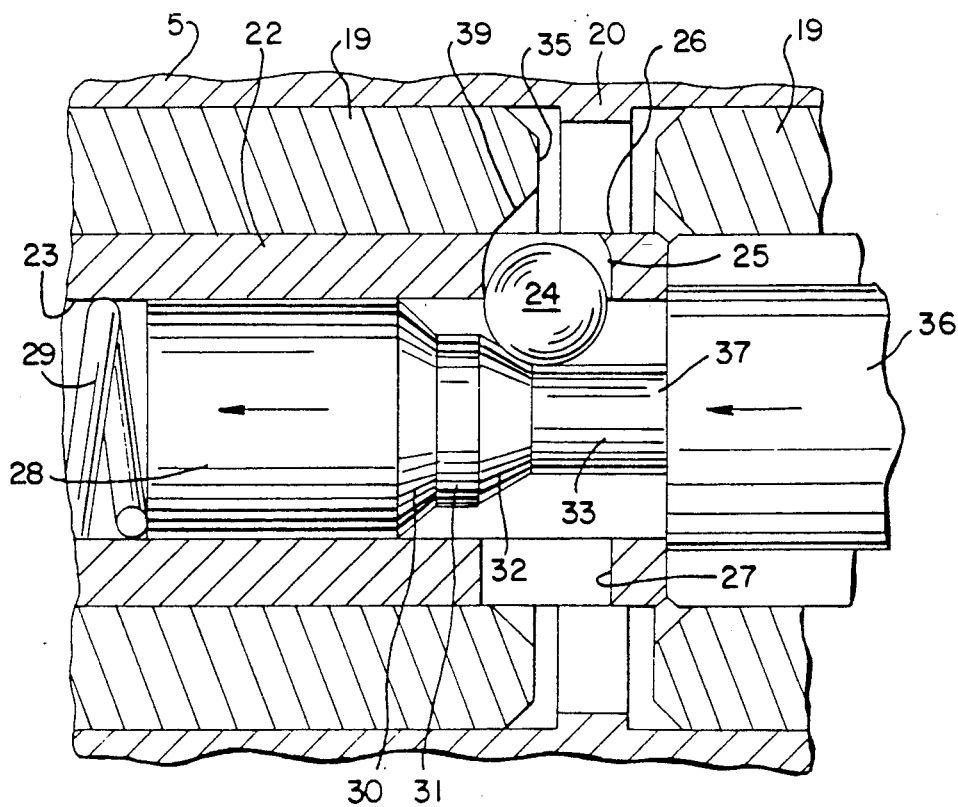
FIG. 4 is a view similar to FIG. 3 showing the locking ball in the release position.

The invention includes a locking mechanism which will prevent outward displacement of drive shaft 14 from spindle 5. The inner end of drive shaft 14 is provided with an axial recess 23 and a locking member, which may take the form of a ball or sphere 24 is mounted for radial movement in a hole 25 that extends radially through the wall of the inner end 22 of the drive shaft 14. As best seen in FIGS. 3 and 4, the outer portion of hole 25 is provided with an inwardly extending lip 26, which will limit the outward movement of the ball in the hole 25. In addition, the opposite side of the inner end 22 of drive shaft 14 is formed with an access hole 27 which is aligned with hole 25 and provides access for a tool which is used in forming the hole 25.

Mounted for sliding movement in recess 23 is a plunger 28, and a spring 29, which is interposed between the bottom of the recess 23 and the inner end of plunger 28, acts to urge or bias the plunger outwardly of recess 23. Engagement of the plunger with the ball 24 prevents displacement of the plunger from recess 23 under the influence of spring 29.

As best seen in FIGS. 3 and 4, the end of plunger 28 is provided with a series of surfaces 30–33. Surface 30 is generally frustoconical in shape and is joined to cylindrical surface 31. In addition frusto-conical surface 32 connects cylindrical surface 31 and cylindrical surface 33.

With drive shaft 14 removed from drive spindle 5, spring 29 urges plunger 28 outwardly to a position where surface 30 is engaged with ball 24, forcing ball 24 outwardly in hole 25. Ball 25, which is trapped by lip 26, will prevent further outward movement of plunger 28 under the influence of spring 29.

To install the drive shaft 14 with the spindle 5, the inner end 22 of the drive shaft is inserted into the passage 7, and as the shaft is inserted, the projecting outer periphery of ball 24 will engage the outer chamfered end 34 of bushing 19, thereby preventing shaft 14 from being fully inserted into the bushing. An elongated rod or tool 36 is then inserted into the opposite end of the spindle 5 and into engagement with the inner end 37 of plunger 28 to depress the plunger against the force of spring 29. Depressing the plunger 28 through tool 36, while applying an inward force to shaft 14, will wedge ball 24 radially inward against chamfered edge 34 to move the ball into engagement with the small diameter section 33 of the plunger. At this time the outer periphery of the ball 24 will be within the outer edge of hole 25 so the ball no longer engages edge 34 of bushing 19 and the shaft 14 can then be moved inwardly. Once ball 24 has cleared the outer end of the bushing, the axial force on plunger 28 through tool 36 can be released. When the ball 24 reaches the inner end 35 of the bushing, spring loaded plunger 28 will wedge the ball outwardly in hole 25, as shown in FIG. 3, where the outer periphery of the ball is engaged with the tapered end surface 39 of bushing 19, and is held against surface 39 by surface 30 of the spring loaded plunger 28, thereby preventing outward displacement of the drive shaft.

When it is desired to remove the drive shaft 14 from spindle 5, tool 36 is inserted into the opposite end of drive spindle 5 and engaged with the end 37 of the plunger, thus moving the plunger inwardly of recess 23 against the force of spring 29. When the plunger 28 has been depressed to the position as shown in FIG. 4, an outward pull or force is applied to the drive shaft, causing ball 24 to be wedged inwardly by engagement with beveled surface 39 until ball 24 lodges against surface 33 of the plunger. The outer periphery of the ball is then within the confines of shaft 14. With the ball in this position, the drive shaft 14 can then be removed from the spindle 5. When the inner end 22 of the drive shaft emerges from the spindle, the force of the spring 29 will urge the plunger 28 outwardly of recess 23 and ball 24 will be wedged outwardly by surface 32 into the hole 25 and held in that position by plunger surface 30.

While the drawings have shown the hub 11, which supports the drive shaft having an outer boss 13 that houses a bearing assembly 15, it is contemplated that in certain installations a pair of hubs, similar to hub 9, can be employed on both ends of the spindle.

The invention greatly speeds up the installation of a drive shaft with a drive spindle of a conveyor, as opposed to prior constructions. With the invention, the drive shaft is automatically locked to the spindle by the locking member or ball 24 to prevent axial displacement. The drive shaft can be released by merely inserting a tool in the opposite end of the spindle to depress the plunger which will enable the ball to move to its release position.

Further, the drive shaft cannot be inserted in the spindle unless tool 36 is used to depress plunger 28 into recess 23 to release ball 24. This prevents a user from inserting drive shafts into opposite ends of the spindle which could then not be removed.

As hexagonal bushings 19 are located at both ends of the drive spindle, the drive shaft can be installed on either side of the conveyor to meet the requirements of the particular installation and it is not necessary to disassemble the conveyor and reverse the spindle to attach the drive shaft to the opposite side of the conveyor, as is necessary when a bushing is located at only one end of the spindle.

In addition, it is possible to slave several conveyors together by utilizing a single drive shaft that extends through a group of aligned spindles 5 of side-by-side conveyors. In this case a hexagonal drive shaft would be operably connected to the hexagonal bushings of the respective spindles.

Various modes of carrying out the invention are contemplated as being within the scope of the following claims particularly pointing out and distinctly claiming the subject matter which is regarded as the invention.

I claim:

1. A conveyor construction, comprising a frame, a tubular drive spindle journaled for rotation relative to the frame and having a first section with a longitudinal opening, an abutment disposed axially inward of said first section, a rotatable drive shaft having an inner end to be received in said opening, means for preventing relative rotation between said drive shaft and said spindle whereby rotation of said drive shaft is transmitted to said spindle, the inner end of said drive shaft having an axial recess and said drive shaft having a radial hole connecting said axial recess with the exterior of said drive shaft, a locking member disposed for movement in said hole, a plunger mounted for movement in said recess and having a surface disposed to engage said locking member, biasing means for biasing said plunger in a first direction to urge said surface into engagement with said locking member and force said locking member outwardly through said hole and into engagement with said abutment to lock said drive shaft against axial displacement relative to said spindle, said plunger being movable in a second direction opposite to said first direction to move said surface out of engagement with said locking member and release said locking member from engagement with said abutment to thereby enable said drive shaft to be removed from said spindle.

2. The construction of claim 1, wherein said first section is a bushing secured within said spindle and said abutment comprises an inner end of said bushing.

3. The construction of claim 1, wherein said locking member comprises a ball.

4. The construction of claim 3, wherein the diameter of the ball is greater than the wall thickness of the inner end of said drive shaft.

5. The construction of claim 4, and including a lip bordering the outer extremity of said hole to prevent outward displacement of said ball from said hole.

6. The construction of claim 1, wherein said biasing means comprises a spring engaged with an end of said plunger.

7. The construction of claim 1, wherein said surface is inclined with respect to the axis of said plunger.

8. The construction of claim 1, wherein an end of the plunger projects beyond the inner end of said drive shaft and is constructed and arranged to be engaged by a tool.

9. A conveyor construction, comprising a frame, a tubular drive spindle journaled relative to the frame and having a longitudinal passage therein, a pair of bushings disposed in said passage with the adjacent ends of said bushings being spaced apart, each bushing having an axial non-circular opening, a drive shaft having an inner end with a non-circular external cross section to complement and be received within an opening in one of said bushings, the inner end of said drive shaft having an axial recess and having a generally radial hole extending through said drive shaft and communicating with said recess, a locking member disposed for movement in said hole, a plunger disposed in said recess and having a surface disposed to engage said locking member, biasing means for biasing the plunger in a first direction to urge said surface into engagement with the locking member and force the locking member outwardly through said hole and into engagement with an end of the respective bushing to thereby lock the drive shaft relative to said spindle, said plunger being movable in a second direction opposite to said first direction to move said surface out of engagement with said locking member and release the locking member from engagement with said end to enable the drive shaft to be removed from said spindle.

10. The construction of claim 9, wherein the opening in each bushing is hexagonal in cross section and the inner end of the drive shaft is hexagonal in cross section.

11. The construction of claim 9, wherein said locking member is a ball having a diameter greater than the radial depth of said hole.

12. The construction of claim 11, and including a lip bordering the outer extremity of said hole to prevent outward displacement of the ball from said hole.

13. The construction of claim 9, wherein said surface is frustoconical.

14. The construction of claim 9, wherein said frame includes a pair of parallel side walls and said construction includes journaling means for journaling the ends of said spindle with respect to the corresponding side walls.

15. A conveyor construction comprising a frame, a drive spindle having a central longitudinal passage extending between said ends, journaling means for journaling the spindle for rotation relative to said frame, a drive shaft having an end engaged with a first end of said passage whereby rotation of said shaft is transmitted to said spindle, locking means for locking the drive shaft against axial movement with respect to the spindle and having a locking position and a release position, and release means responsive to a force exerted through a second end of said passage for moving said locking means from the locking position to the release position to enable the drive shaft to be inserted into said spindle and to be removed from said spindle.

16. The construction of claim 15, and including biasing means for biasing said locking means to the locking position, said force acting to overcome the force of said biasing means.

17. The construction of claim 15, and including a pair of bushings disposed in longitudinally spaced relation in said passage, each bushing having a central opening with a non-circular cross section, said end of the drive shaft having a complementary non-circular cross-section and being received in said opening in one of said bushings.

18. The construction of claim 15, wherein said journaling means comprises first bearing means disposed solely within said spindle.

19. The construction of claim 18, wherein said journaling means also includes second bearing means disposed laterally outward of said frame.

20. In a conveyor construction, a frame including a pair of side members having aligned apertures therein, a drive spindle mounted on said frame, a conveyor belt supported by said drive spindle, the improvement comprising a longitudinal bore in said spindle, said bore having a central section, an intermediate section disposed on each side of said central section, and an end section located outwardly of each intermediate section, the diameter of said end sections being greater than the diameter of said intermediate sections, a bearing assembly disposed in each of said end sections, a mounting member projecting through each aperture and journaled in the respective bearing assembly, a bushing secured in each intermediate section, each bushing having a non-circular longitudinal opening, the openings in said bushings being in alignment and at least one of said openings disposed to receive a drive shaft.

21. The construction of claim 20, wherein the diameter of the central section is less than the diameter of said intermediate sections to provide a shoulder between the central section and each intermediate section, an end of each bushing being disposed against the corresponding shoulder.

22. The construction of claim 20, wherein each bearing assembly is disposed wholly within the respective side member of the frame.

23. The construction of claim 20, wherein one of said mounting members comprises a drive shaft and the other of said mounting members comprises a hub.

* * * * *